United States Patent
Prause

(10) Patent No.: US 9,525,542 B2
(45) Date of Patent: Dec. 20, 2016

(54) SYNCHRONIZATION TO UPSTREAM BURSTS

(71) Applicant: JDSU Deutschland GmbH, Eningen (DE)

(72) Inventor: Dominik Prause, Reutlingen (DE)

(73) Assignee: VIAVI SOLUTIONS DEUTSCHLAND, Eningen Unter Achalm (DE)

( * ) Notice: Subject to any disclaimer, the term of this patent is extended or adjusted under 35 U.S.C. 154(b) by 133 days.

(21) Appl. No.: 14/318,840

(22) Filed: Jun. 30, 2014

(65) Prior Publication Data
US 2015/0010306 A1 Jan. 8, 2015

Related U.S. Application Data

(60) Provisional application No. 61/842,255, filed on Jul. 2, 2013.

(51) Int. Cl.
| | | |
|---|---|---|
| *H04B 10/20* | (2006.01) | |
| *H04J 14/00* | (2006.01) | |
| *H04L 7/00* | (2006.01) | |
| *H04J 3/16* | (2006.01) | |
| *H04L 7/04* | (2006.01) | |
| *H04B 10/27* | (2013.01) | |

(52) U.S. Cl.
CPC .............. *H04L 7/0075* (2013.01); *H04B 10/27* (2013.01); *H04J 3/1694* (2013.01); *H04L 7/042* (2013.01)

(58) Field of Classification Search
USPC .................................. 398/58, 66, 70, 71, 72
See application file for complete search history.

(56) References Cited

U.S. PATENT DOCUMENTS

| | | | | |
|---|---|---|---|---|
| 6,055,021 | A * | 4/2000 | Twitchell ............... | H01Q 21/26 348/512 |
| 7,756,418 | B2 * | 7/2010 | Ofalt .................... | H04B 10/077 356/73.1 |
| 8,102,851 | B1 * | 1/2012 | Mandin ............... | H04L 25/4975 370/390 |
| 8,259,734 | B2 | 9/2012 | Feng et al. ............... | 370/395.51 |
| 2009/0123159 | A1 * | 5/2009 | Leung .................... | H04L 7/042 398/154 |
| 2009/0322482 | A1 * | 12/2009 | Schuessler ............... | H04Q 9/00 340/10.1 |

(Continued)

FOREIGN PATENT DOCUMENTS

EP 2169852 3/2010 ............. H04B 10/16

OTHER PUBLICATIONS

Search Report for EP Appln No. 14175386 dated Oct. 31, 2014.
ITU-T G.984.3 Telecommunication Standardization sector of ITU Series G: Transmission Systems and Media, Digital Systems and Networks Digital sections and digital line system—Optical line systems for local and access networks Gigabit-capable passive optical networks (G-PON): Transmission convergence layer specification (Mar. 2008).

*Primary Examiner* — David Payne
*Assistant Examiner* — Pranesh Barua
(74) *Attorney, Agent, or Firm* — Mannava & Kang, P.C.

(57) ABSTRACT

The invention relates to a method and apparatus for synchronizing to upstream bursts of frames when a delimiter pattern normally used for the synchronization is a-priory unknown. The method includes identifying in a specific received signaling burst a sequence of pre-defined fixed bits, determining the position and bit pattern of the identified delimiter based on the found position of the fixed bits in the signaling burst, and using the found delimiter pattern to synchronize to following bursts in a burst stream.

20 Claims, 10 Drawing Sheets

(56) References Cited

U.S. PATENT DOCUMENTS

| | | | | |
|---|---|---|---|---|
| 2010/0129086 A1* | 5/2010 | Stiscia | H04J 3/1694 398/182 |
| 2010/0183107 A1* | 7/2010 | Sugawa | H04L 7/0083 375/354 |
| 2010/0316379 A1* | 12/2010 | Suvakovic | H04J 3/1694 398/58 |
| 2011/0044699 A1* | 2/2011 | Li | H04J 3/1694 398/182 |
| 2011/0293288 A1* | 12/2011 | Ogushi | H04L 1/0045 398/154 |
| 2012/0027407 A1* | 2/2012 | Feng | H04L 7/041 398/43 |
| 2013/0114962 A1* | 5/2013 | Oka | H04L 7/042 398/67 |
| 2013/0148968 A1* | 6/2013 | Takizawa | H04L 7/04 398/66 |
| 2014/0161441 A1 | 6/2014 | Cortes Santaolalla et al. | 398/20 |

* cited by examiner

SYNCHRONIZATION TO UPSTREAM BURSTS

CROSS-REFERENCE TO RELATED APPLICATIONS

The present invention claims priority from U.S. Provisional Patent Application No. 61/842,255 filed Jul. 2, 2013, entitled "Method, System, and Device for Frame Synchronization", which is incorporated herein by reference.

TECHNICAL FIELD

The present invention generally relates to communication networks, and more particularly relates to a method and apparatus for frame and/or burst synchronization in network connected receivers.

BACKGROUND

A passive optical network (PON) is an optical fiber access technology that enables a cost effective solution for connecting a large number of subscribers. FIG. 1 illustrates an exemplary PON 108 integrated in a communication network context 100. A plurality of subscriber-side Optical Network Unit (ONU) devices 105.1 to 105.n are connected to a central office-side Optical Line Terminal (OLT) device 102 via a passive Optical Distribution Network (ODN) 107, which typically includes only passive components such as optical fibers 103, optical power splitters 104, and optical connections 109. The OLT 102 is typically connected to another network 101, e.g. an Ethernet or the like. The ONUs 105.1 to 105.n, which may be generally referred to herein as ONU 105 and which are connected to the ODN 107 on one side, on the other side are typically connected with respective subscriber networks or subscriber devices 106.1 to 106.n, which act as the end receiver and/or source of the payload data transmitted in the PON.

In a PON, it is common to define the transmission direction from the OLT to the ONUs as the 'downstream' direction, and the transmission direction from an ONU to the OLT as the 'upstream' direction, and these definitions are used herein. Due to the tree-like topology of a PON, the transmission modes for downstream and upstream are different. For the downstream transmission, the OLT broadcasts optical signal to all the ONUs in continuous mode (CM), and each particular ONU accepts only those downstream frames in the CM stream which headers specify it as the target destination of the frame. However, in the upstream channel, ONUs adopt burst mode (BM) transmission wherein each ONU only transmits in a time slot allocated to it by the OLT, so that signals from different ONUs do not overlap at the OLT. Since the timings of the upstream bursts received by the OLT from different ONUs are not synchronized, a burst synchronization procedure has to be performed by the receiving end of the OLT or any other PON-connected device attempting to extract information contained in the upstream bursts.

One variant of the PON access technology, which is known as Gigabit-capable PON (GPON), supports transmission rates in excess of 1 Gbit/s and is specified in G.984-series of ITU-T Recommendations. In GPON defined by ITU-T G.984, the upstream bursts generated by the ONUs include a 24-bit burst delimiter bit pattern at a pre-determined position within the burst. These burst delimiter bit patterns are defined in messages that the OLT sends to the ONUs at their activation, and are then used by the OLT for the burst synchronization of the received upstream bursts, i.e. to determine the start position of the burst.

FIG. 2 illustrates an exemplary method 200 of establishing upstream burst synchronization in a GPON system, which may be performed by a burst synchronizer function, which may be implemented within an OLT or a test instrument. As shown in FIG. 2, the synchronizer function first receives a bit sequence 201 recovered from the received optical burst signal as known in the art. When the received bit sequence becomes 24 bits or larger, the synchronizer function performs a pattern matching operation 202 starting with first 24-bits received, to detect whether a portion of the bit sequence matches the 24-bit upstream burst delimiter pattern predetermined as a PON system parameter.

If the matching failed, i.e. the delimiter pattern is not detected, the synchronizer function shifts the matching position in the bit sequence by 1-bit, as illustrated by an arrow 202.1. That is, when the current matching operation that was performed starting at bit n of the received bit sequence did not produce a match, the matching operation 202 is then repeated starting at bit n+1 of the received bit sequence, attempting to detect the delimiter pattern again. If the matching succeeds at a particular alignment of the delimiter pattern and the received bit sequence, as illustrated by an arrow 202.2, the synchronizer function determines the next bit following the delimiter pattern to be the beginning position of the data portion of the upstream burst, and performs burst synchronization and data processing 203.

Importantly, the upstream burst delimiter pattern has to be known by the synchronizer function of the burst receiving device in order to perform the matching operation. In GPON systems defined in ITU-T G.984, the delimiter pattern to be used for upstream bursts sent from an ONU to the OLT is set by the OLT as an ONU parameter in the activation process of the ONU, and in general may be an arbitrary bit pattern of 24-bits length. In the most common use case the burst synchronization function is implemented by the OLT when receiving upstream transmission bursts, and is known a priori within the OLT. In the case of a test instrument that is connected within the ODN, e.g. inserted at optical connection points 109, the delimiter pattern of the upstream bursts is generally not known a priori. Accordingly, test instruments that are used for testing upstream transmission parameters heretofore had to obtain the delimiter pattern either by user input or by analyzing an Upstream_Overhead message as defined in ITU-T G.984, which is transmitted by the OLT in downstream direction in the activation process of the ONU. Therefore, prior art upstream transmission test instruments had to either require the user to obtain the delimiter pattern using alternative means and then input it into the tester, or include circuitry for receiving and decoding both the upstream and downstream transmission, which increased their cost and implementation complexity. In cases where only upstream data contains valuable information, such as in upstream transmission testing, it would be desirable to omit downstream receiver facilities in a test instrument.

An object of the present invention is to provide a method and/or device for synchronizing to upstream bursts based on information that is obtainable from the upstream transmission without requiring a downstream transmission decoding.

SUMMARY

Accordingly, an aspect of the present invention relates to a method for synchronization to upstream transmission bursts in a network testing device, wherein the upstream transmission bursts comprise a delimiter bit sequence that is unknown to the network testing device, the method comprising: a) receiving by the network testing device a first upstream burst signal comprising a first upstream signaling burst, wherein the first upstream signaling burst includes the unknown delimiter bit sequence and a sequence of at least partially fixed bits at known fixed bit positions relative to the delimiter bit sequence; b) finding in the received burst signal a matching bit pattern that matches at least one pre-defined target bit sequence, wherein the at least one pre-defined target bit sequence corresponds to the sequence of at least partially fixed bits in the first signaling burst; c) retrieving the delimiter bit pattern from the received first signaling burst based on a position therein of the matching bit pattern found in step (b) and the known position of the at least partially fixed bits relative to the delimiter bit sequence in the first signaling burst, and saving said delimiter bit pattern in a delimiter memory of the network testing device; and, d) using the saved delimiter bit pattern to synchronize to subsequently received upstream transmission bursts.

Another aspect of the present invention relates to an optical network testing device for receiving upstream transmission bursts from a downstream ONU, the network testing device comprising: an optical to electrical converter for converting a received optical burst signal comprising an upstream data burst into an electrical data signal, wherein the upstream data burst comprises a delimiter bit sequence; a clock and data recovery unit for converting the electrical data signal into a received bit sequence representing the upstream data burst; a burst processing logic for determining the position of a delimiter bit sequence in the a received bit sequence; a data processing unit for processing data carried by the received upstream burst; and, an output device for outputting processing results. The burst processing logic comprises: a target bit pattern memory containing one or more pre-defined target bit sequences, the one or more pre-defined target bit sequences representing a sequence of at least partially fixed bits of one of the upstream transmission bursts; a matching bit pattern finder logic for finding in the received burst signal a matching bit pattern that matches one of the one or more pre-defined target bit sequences; a delimiter pattern extractor logic for extracting the delimiter bit pattern from the received bit sequence based on the position therein of the matching bit sequence found by the matching bit pattern finder logic; a delimiter memory for saving the delimiter bit pattern; and, a burst synchronization logic for synchronizing subsequently received upstream transmission bursts using the delimiter bit pattern saved in the delimiter memory.

BRIEF DESCRIPTION OF THE DRAWINGS

The invention will be described in greater detail with reference to the accompanying drawings, which represent preferred embodiments thereof and in which like elements are indicated with like reference numerals, and wherein.

DETAILED DESCRIPTION

Figure 1:
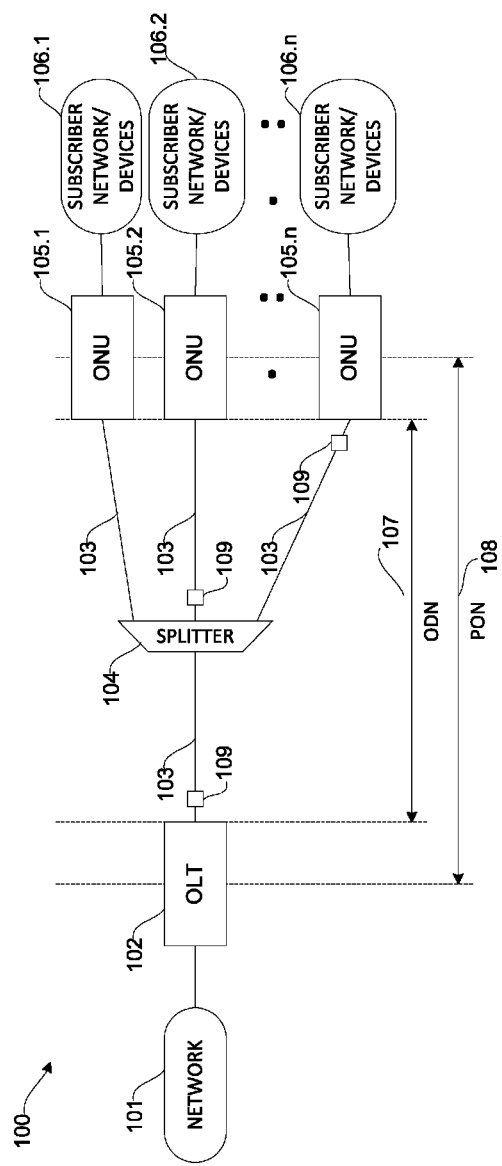
FIG. 1 illustrates a block diagram of an exemplary passive optical network (PON)

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. Furthermore, to facilitate an understanding of the invention, many aspects of the invention are described in terms of sequences of actions to be performed by functional elements of a tester apparatus for testing upstream transmission in a bi-directional network such as a PON. It will be recognized that in each of the embodiments, the various actions including those depicted as blocks in flow-chart illustrations and block schemes could be performed by specialized circuits, for example discrete logic gates interconnected to perform a specialized function, by computer program instructions being executed by one or more processors, or by a combination of both. Thus, the various aspects of the invention may be embodied in many different forms, and all such forms are contemplated to be within the scope of the invention.

The following definitions are applicable to embodiments of the invention: the term 'burst', as used herein, refers to a transmission data structure that is synchronized at reception as a single unit using a specific bit/symbol sequence that is assumed to be known to the receiver and is included therein for the purpose of synchronization. It encompasses the upstream bursts as defined in PON specification documents such as ITU-T G.984, and may encompass data frames or bursts as defined in other transmission systems using asynchronous packet transmission, including but not limited to XG-PON systems as defined in ITU-T G.987, and 1G-EPON and 10G-EPON systems defined in IEEE 802.3ah and IEEE 802.3av. Hereinbelow the term 'frame' may be used interchangeably with the term 'burst' and should not be confused with GEM frames or GTC frames as defined in ITU-T G.984.

As used herein, the terms "first", "second" and so forth may not be intended to imply sequential ordering, but rather are intended to distinguish one element from another, unless explicitly stated.

An aspect of the present invention relates to a network testing device, which is exemplified in the present description by an apparatus for testing upstream transmission in a GPON, hereinafter referred to as a PON tester, and to a method of upstream burst synchronization implemented by the tester. One particular aspect of the invention relates to a method for obtaining the upstream burst delimiter pattern automatically, i.e. based on upstream transmission without user interaction, in embodiments where the delimiter pattern is not known a-priori. The method is based on an observation that an upstream transmission typically includes signaling messages that are transmitted using signaling frames or bursts that include pre-defined fixed bits at pre-defined fixed bit positions. These fixed bits and their positions may be defined for example by industry-wide specification documents, such as for example the ITU-T G.984 series of documents for the exemplary case of GPON described herein, and therefore are known a-priory, and may be used by a receiving device to synchronize to, and to determine the position of the delimiter bit sequence in the frame, and therefore to discover the delimiter bit pattern from the signaling burst itself without knowing it a-priory. Once the delimiter bit pattern is discovered from a signaling burst, it can be used to synchronize to consecutively received bursts generated by the same ONU, which may not have the known fixed bit positions, or have too few of them for a reliable synchronization.

Figure 3:
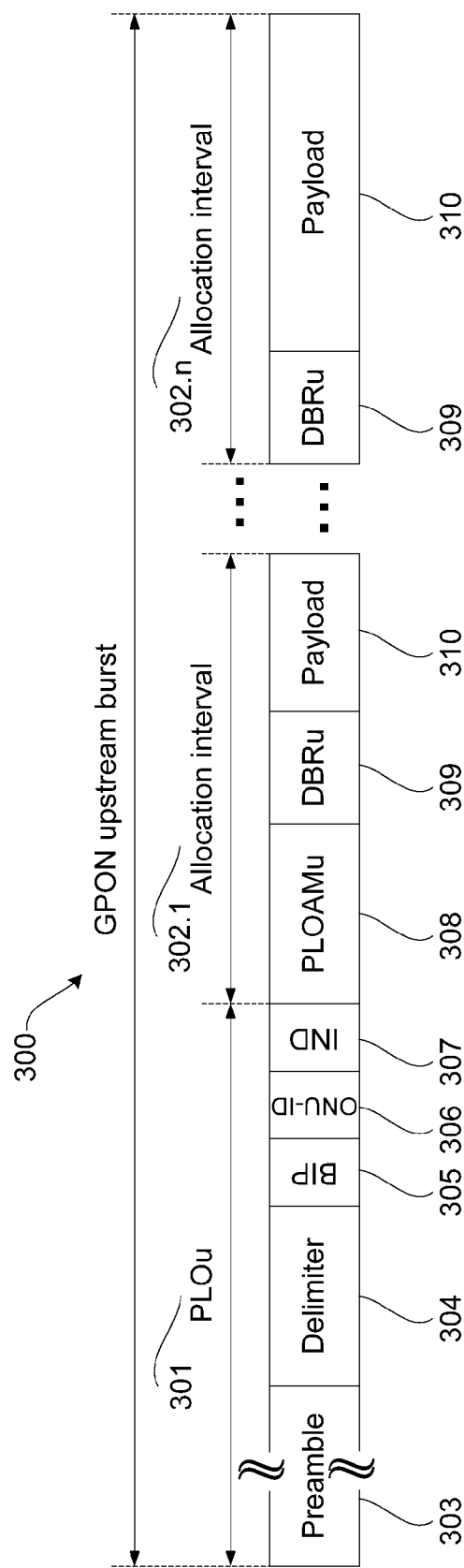
FIG. 3 illustrates a schematic representation of a data field structure a GPON upstream burst.

With reference to FIG. 3, there is illustrated by way of example a structure of a GPON upstream burst 300 as defined in ITU-T G.984. The upstream burst 300 includes a Physical Layer Overhead upstream (PLOu) portion 301 and one or more allocation intervals 302.1 to 302.n. The PLOu portion 301 is further divided into a preamble section 303, typically used for receiver gain control and clock recovery, a delimiter section 304, typically used for burst synchronization, a bit interleaved parity (BIP) field 305, typically used for error rate calculations, an ONU-ID field 306 containing a unique number within the PON that is typically used for ONU identification, and an indication (IND) field 307, typically used for status reporting from an ONU to the OLT. An allocation interval 302 may contain two types of overhead fields, i.e. an upstream physical layer operations, administration and management (PLOAMu) message field 308 and/or an upstream dynamic bandwidth report (DBRu) field 309, and it contains a payload section 310 which generally contains user data.

The upstream burst 300 may be scrambled, for example using a burst-synchronous scrambling polynomial. GPON systems that comply with ITU-T G.984 use the polynomial x7+x6+1. In such systems, the pattern generated using this polynomial is added modulo two to the upstream data. The shift register used to calculate this polynomial is reset to all-ones at the first bit following the delimiter field 304 of the PLOu, and is allowed to run until the last bit of the transmission.

Figure 4:
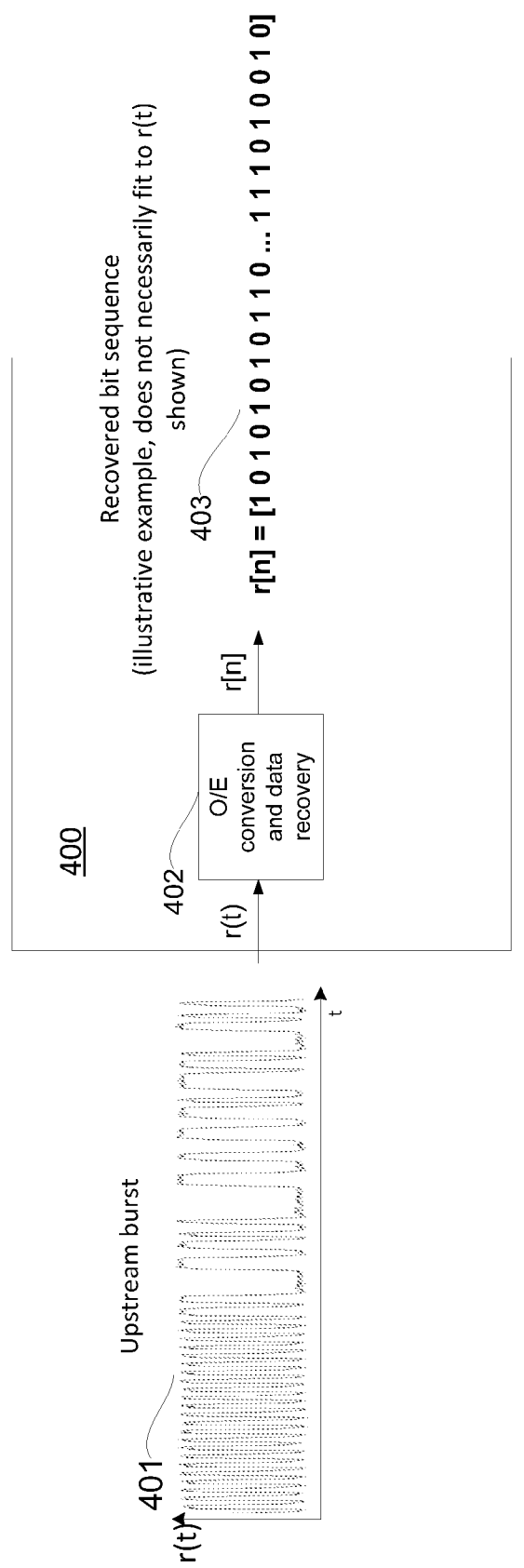
FIG. 4 illustrates a schematic diagram illustrating the conversion by a receiver of an upstream optical burst signal into a received bit sequence.

Referring now to FIG. 4, an upstream transmission receiving device 400 receives the upstream bursts 300 in the form of an upstream burst signal 401, and converts it into a received bit sequence r[n] 403 using a conversion means 402, which implement the optical to electrical (O/E) conversion and data recovery operation as known in the art. As the result the recovered bit sequence 403 represents the data burst or bursts recovered from the upstream burst signal 401. The upstream transmission receiving device 400, of which only the receiving end is illustrated, may be for example the OLT, but more pertinently to the present disclosure may be a PON tester instrument for testing the upstream transmission in the PON, which may not have any a-priory knowledge of the delimiter bit pattern contained in the delimiter field 304 of the burst 300.

When the upstream burst 300 is generated by the ONU, the preamble portion 303 has a predetermined length. When receiving the upstream burst, the receiver device 400, such as the OLT or a PON tester, converts the received burst signal 401 into the bit sequence 403 prior to performing burst synchronization. Due to the conversion process, the length of the preamble portion 303 in the bit sequence may vary. Due to the variable length of the preamble portion, the receiving device 400 may not know the beginning position of the delimiter portion 304 in the bit sequence 403, and is not capable of determining it simply by counting a certain number of bits from the first bit received.

In accordance with an aspect of the present invention, the following method may be used to discover the delimiter position in a received bit sequence that is recovered from certain specific upstream bursts carrying pre-defined signaling messages resulting in the existence of pre-defined bits and bit sequences at fixed bit positions within the burst. Exemplary embodiments of the method described hereinbelow make use of a first and optionally of a second upstream burst sent from an ONU in the activation process specified in ITU-T G.984; however the method could be easily adopted to other transmission systems using specific bit patterns for burst/frame synchronization and signaling messages of pre-defined structure that give rise to fixed bit positions. The ITU-T G.984.3 Recommendations document, which is incorporated herein by reference, specifies that the very first upstream burst that is generated by an ONU in the ONU activation process carries a Serial_Number_ONU message. It is also known from the ITU-T G.984 Recommendations that in that first 'signaling' burst carrying the Serial_Number_ONU message the ONU-ID field 306 is FF'h, and the PLOAMu message 308 sent in the first allocation interval of that first 'signaling' burst starts with FF01'h; here and in the following, " . . . 'h" denotes hexadecimal numbers.

Figure 5:
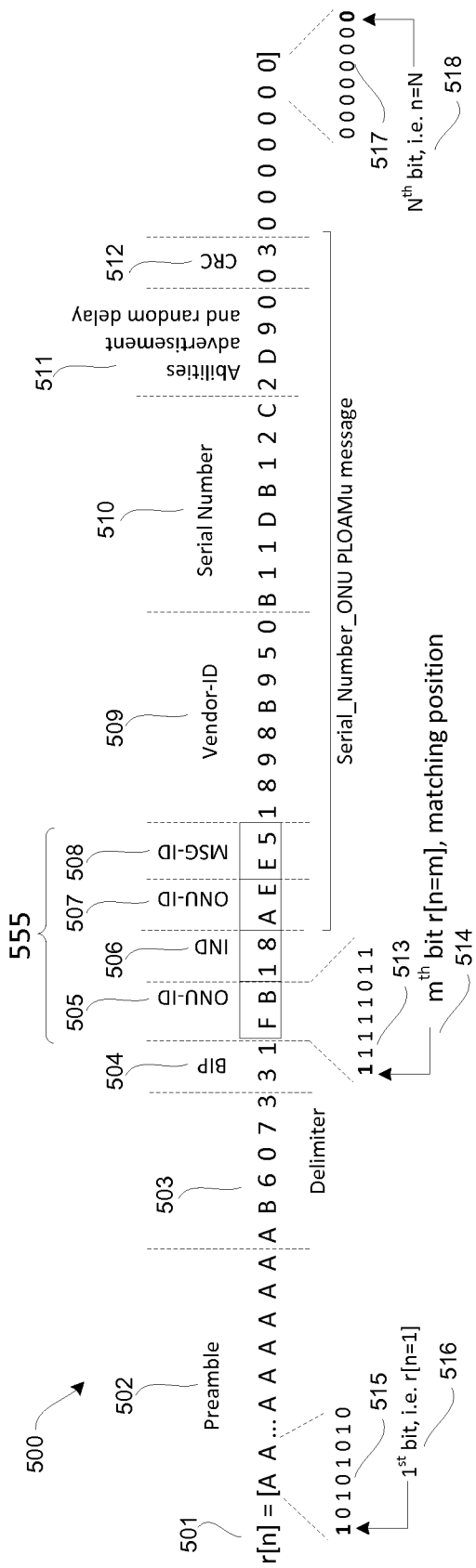
FIG. 5 illustrates a schematic representation of a data field structure of a first upstream burst generated by an ONU in an ONU activation process.

Referring now to FIG. 5, there is shown a commented exemplary received bit sequence r[n] 501 in the hexadecimal representation including a Serial_Number_ONU PLOAMu message 500. It will be appreciated that each hexadecimal value corresponds to a specific bit sequence, and that defining a specific hexadecimal value singularly defines a corresponding bit sequence. The hexadecimal representation is used hereinbelow merely as a matter of convenience, as it enables to define a four bit sequence using a single letter or numeral. The preamble portion 502, having an unknown number of '1 0 1 0' (hexadecimal A'h) repetitions, is followed by a yet unknown 24-bit long delimiter bit sequence or pattern 503, which is by way of example shown as a hexadecimal "AB6073'h" sequence. Following the delimiter bit sequence 503, there is one-byte sequence 504 containing the BIP information, in general these bits may have an arbitrary value. Due to the scrambling, the first ONU-ID field 505 is FB'h, corresponding to unscrambled data FF'h. Following the first ONU-ID field 505 is the IND field 506 of 8-bits in length which typically contains 18'h, corresponding to unscrambled data 00'h, but may contain three other values as described hereinafter. Following the IND field 506 is the second ONU-ID field 507 of 8-bits in length which contains AE'h (unscrambled data is FF'h). Following the second ONU-ID field 507 is the MSG-ID field 508 of 8-bits in length which always contains E5'h, corresponding to unscrambled data 01'h. Following the MSG-ID field 508 is the vendor-ID field 509 of 32-bits in length, the serial_Number field 510 of 32-bits in length, the ability advertisement and random delay field 511 of 16-bits in length and the CRC field 512 of 8-bits in length. Depending on the operating conditions of the PON, the IND field 506 may alternatively contain 58'h, 78'h, or 38'h depending on the bits set by the ONU. Thus, the sequence of bits 555 contained in the pre-defined fields 505-508 is at least in part fixed by the ITU GPON specification; this sequence of bits that is at least partially pre-defined is referred to herein as the sequence of at least partially fixed bits. It will be appreciated that similar bit sequences that are at least partially pre-defined, for example by an industry-standard specification, may exist in specific frames of other communication systems, and that embodiments of the method of the present disclosure may be easily adopted for such systems.

Figure 6:
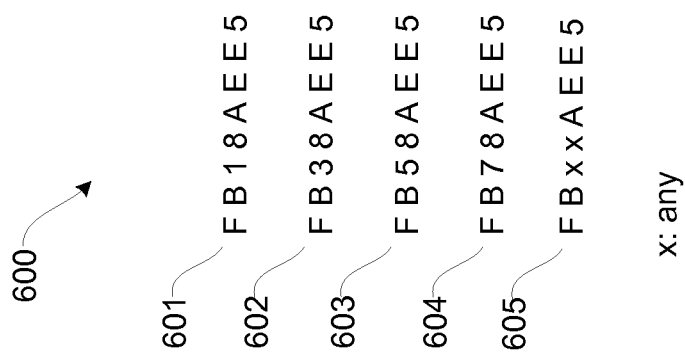
FIG. 6 illustrates an exemplary set of target bit sequences corresponding to a sequence of at least partially fixed bits in the first upstream burst of FIG. 5.

Referring now to FIG. 6, there are shown five exemplary bit patterns $p_a[k]$ 601 to 605 of length K, which the first 'signaling' burst carrying the Serial_Number_ONU PLOAMu message 500 may include at a predefined position within the burst and relative to the delimiter 503, and which are generally referred to herein as the target bit sequences or patterns 600. As follows from the description hereinabove, the target bit sequences 600 correspond to the "known", or 'fixed' symbols or bits 555 having pre-defined fixed bit positions in the message 500, which include "FB" from the first ONU-ID field 505, "18" or "38" or "58" or "78" or arbitrary "xx" (sequences 601, 602, 603, 604, and 605, respectively), "AE" from the second ONU-ID field 507, and "E5" from the MSG-ID field 508 as explained above, all hexadecimal. In accordance with an aspect of the present invention, these exemplary target sequences 600 may be used as "targets" to find in the received bit sequence 501 the matching pattern of the fixed bits 555, and therefore to determine the exact position of specific pre-defined fields in the received bit sequence, instead of the delimiter sequence that is traditionally used for burst synchronization It will be appreciated that in other implementation, the fixed bits 555 and the corresponding target bit sequences 600 may be different from those shown in FIG. 6.

Figure 7:
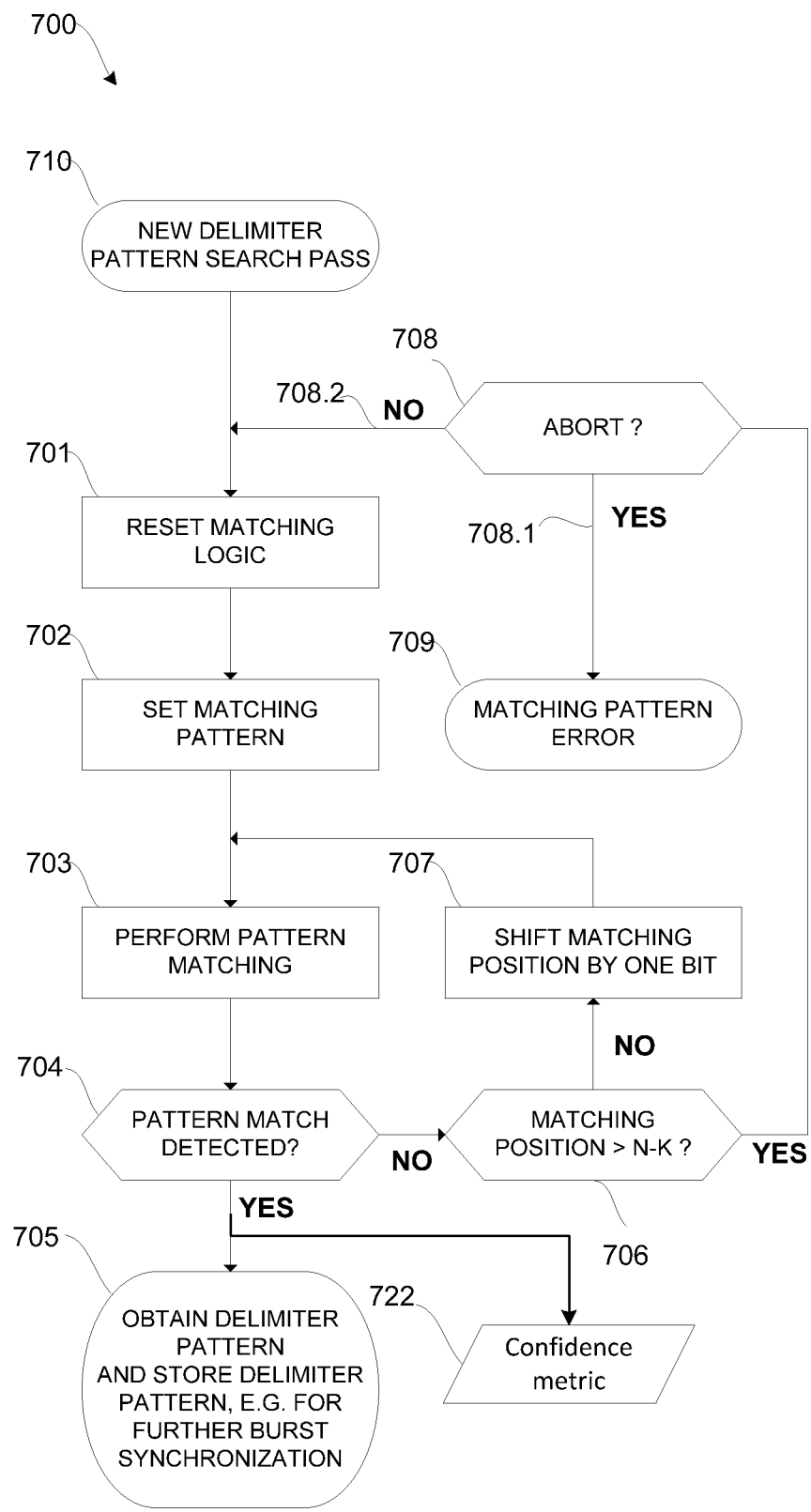
FIG. 7 illustrates a flowchart of a method of finding the delimiter bit sequence in the received first upstream burst using a set of pre-determined target bit sequences.

Referring now to FIG. 7, there is illustrated one embodiment of a method 700 for obtaining the delimiter 503 from a received bit sequence r[n] that is recovered from a specific 'signaling' upstream burst, wherein said burst includes a sequence of pre-defined at least partially fixed bits at pre-defined bit positions within the burst, using target bit patterns or sequences $p_a[k]$ 600 corresponding to the sequence of at least partially pre-defined fixed bits. By way of example, the received bit sequence r[n] may be the exemplary bit sequence r[n] 501 of length N shown in FIG. 5, and the exemplary matching or target patterns $p_a[k]$ 600 of length K may be the target bit sequences 601 to 605 shown in FIG. 6.

In the shown embodiment, the method utilizes a pattern matching functionality, which may be referred to hereinbelow as the pattern matching logic, and which compares a target bit pattern 600 to a selected subsequence of bits of the same length K from the received bit sequence r[n], and outputs for example the Hamming distance D therebetween, i.e. the number of bit positions where the compared bit sequences differ, or just whether a complete match has been detected (D=0) or not. One skilled in the art would appreciate that such pattern matching functionality can be easily realized using either software or hardware logic.

Figure 8:
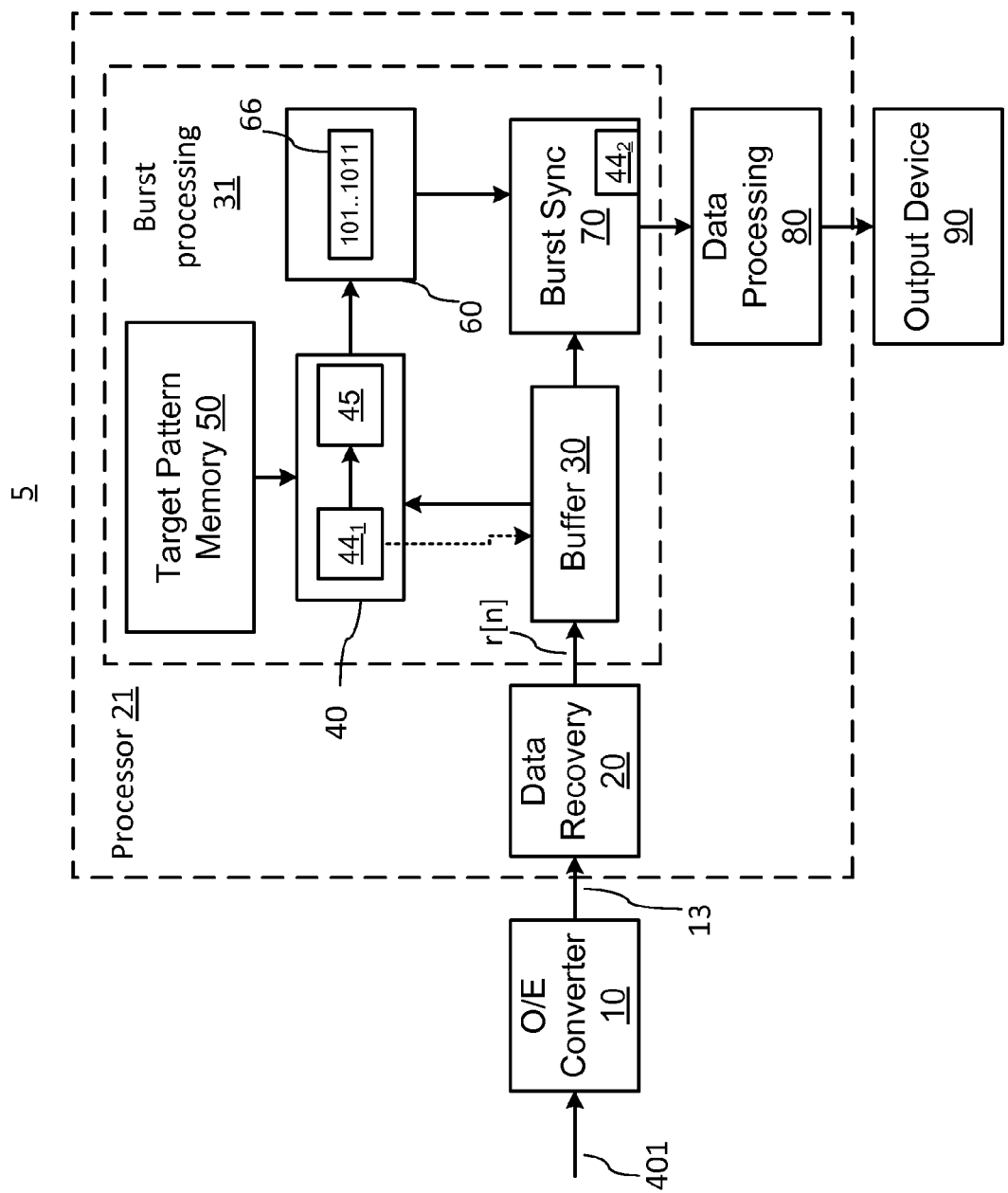
FIG. 8 illustrates a schematic functional block diagram of a PON testing device.

Embodiments of the method 700 will be described hereinbelow with reference to a flowchart of FIG. 7, and also with reference to FIG. 8 illustrating a functional block diagram of an exemplary PON tester 5 configured to implement the method; here, only those functional blocks that pertain to the present invention are shown. As illustrated, the PON tester 5 includes an optical to electrical converter 10 that is followed by a clock and data recovery (CDR) unit 20, which is in turn followed by a burst processing logic 31, a data processing logic 80 and an output device 90. Blocks 20-80 may be implemented using one or more digital processors 21. In operation, the PON tester 5 may be connected to the PON 108 of FIG. 1 at a desired location therein so as to receive the upstream burst signal 401 from one or more ONUs 105, for example at one of the connectors 109 within the ODN 107. The O/E converter 10, which typically includes a photodetector, such as a photodiode, and may include a pre-amplifier, converts the received optical burst signal 401 into an electrical signal 13, which is then passed through a clock and data recovery (CDR) unit 20 to recover therefrom a data signal, typically in the form of the received bit signal r[n] 403 or 501. Possible implementations of the O/E converter 10 and the CDR 20, which together form the conversion means 402 shown in FIG. 4, are well known in the art and are not described herein. It will be appreciated that logic blocks 20, 40, 70, and 80 may be implemented using hardware logic, which may be defined for example in an FPGA, or as software logic. When implemented as software logic, the logic blocks 20, 40, 70, and 80 represent a set of computer executable instructions that are saved in a memory device that is defined within, or is readable by, the processor 21, which may be in this case embodied for example as a digital signal processor (DSP).

Referring again to FIG. 8, the burst processing logic 31 includes a buffer memory 30, a delimiter finder logic 40 including a first bit/symbol pattern matching logic $44_1$ and a delimiter pattern extracting logic 45, a target pattern memory 50, a delimiter memory 60, and a burst synchronization unit 70 which may also include a second pattern matching logic $44_2$. One function of the burst processing logic 31 is to determine the exact position of an upstream burst in the received bit sequence r[n], which may amount to determining the position of the first bit of the burst, or of a particular pre-defined field of the burst, in the received sequence, and which is referred herein as the burst/frame synchronization. For this purpose, the recovered bit sequence r[n], which may for example represent or include the received bit sequences 403 or 501, is first saved in the buffer 30. If the delimiter memory 60 contains a delimiter pattern 66 for the received burst, the burst sync unit 70 may search in the recovered bit sequence r[n] for the position of the bit sequence matching the saved delimiter pattern, for example using matching logic 44 and the method 200 described hereinabove with reference to FIG. 2. If the search is unsuccessful, or if the delimiter pattern 66 is not known, the delimiter finder unit 40 searches for the delimiter bits 503 in the received bit sequence r[n] using one or more target bit patterns saved in the target pattern memory 50, for example by implementing method 700 described hereinbelow with reference to FIG. 7, or a variant thereof. Once the delimiter bit sequence 503 is found in the received bit sequence r[n], it is saved in the delimiter memory 60 as the delimiter pattern 66, and may be used by the burst sync unit 70 to synchronize the device to newly received upstream bursts. Once the exact position of the delimiter 503, and therefore all other bits of the burst in the received bit sequence r[n] is determined, the data processing unit 80 may perform desired data processing on the received bits, for example to access transmission parameters and/or quality as known in the art, or for other purposes as desired for a particular application. The results of the processing may be saved or communicated to the user using the output device 90, which may be for example in the form of a display, a network card, a non-volatile memory device, or any other suitable output device.

Turning now back to FIGS. 7 and 5 while continuing to refer to FIG. 8, the delimiter finder logic 40 may implement an embodiment of the method 700, which may be described as follows. After starting a new delimiter pattern search pass 710, in a first step 701 the first matching logic $44_1$ is reset to an initial position, which may be defined by a matching position counter m=1. For example, the matching start position r[m], which is shown in FIG. 5 by way of example at 514, may be set so that the first bit r[n=m=1] of the received bit sequence r[n] is aligned with the first bit p[k=1] of a target pattern p[k] 600. At step 702, a first matching pattern $p_a$[k], with a=1, . . . , A, is selected from a set of the target patterns, for example the set of target patterns 601 to 605 shown in FIG. 6, and the selected target pattern is loaded into the matching logic 702; here 'A' denotes the total number of the matching target patterns. At step 703, the pattern matching logic 44 performs the matching operation, i.e. compares the vector $\overline{p_a}$=[$p_a$[1], $p_a$[2], . . . , $p_a$[K]] representing the selected target bit pattern 600 with the vector $\overline{m}$=[r[m], r[m+1], . . . , r[m+K]] representing a same-length portion of the received bit sequence r[n]. If a match is detected at step 704, i.e. the position of the matching sequence 555 formed of the pre-defined fixed bits 505-508 in the received bit sequence r[n] 501 is found, the operation proceeds to step 705, wherein the delimiter extracting logic 45 determines the position of the delimiter portion 503 in the received bit sequence based on the known matching position m 514 where the match is detected, and the known positions of the fixed bits 505-508 relative to the delimiter 503, and copies the found delimiter bit sequence 503 into the delimiter memory 60. In the exemplary case of the GPON system defined by ITU-T G.984, if a pattern match is detected at the matching start position m, the delimiter pattern is obtained at 705 by retrieving the 24-bits bit sequence starting at bit position (m−32) of the received bit sequence r[n], i.e. r[n=m−32], accounting for the 8-bit BIP sequence 504 between the end of the 24-bit delimiter 503 and the beginning of the fixed bit sequence 505-508 that is being searched for. A copy of the extracted delimiter sequence 503 may be stored in the delimiter memory 60 as the delimiter pattern 66 for further usage and/or processed as desired. It will be appreciated that the delimiter pattern 66 may be stored in the delimiter memory 60 in different forms, including but not limited to as a binary value, i.e. a sequence of bits, or as a hexadecimal value, or in any other suitable form.

If a pattern match is not detected at 704 and the current matching position m is less than or equal to (N−K), where N is the number of bits in the bit sequence r[n] and K is the number of bits in the target sequence $p_a$[k], the matching position m is incremented at step 707 and the pattern matching step 703 is performed again. If a pattern match is not detected at 704 and the current matching position m is greater than N−K, at step 708 the algorithm is either aborted with a matching pattern error 709, or the matching means is reset 701 and another matching pattern is selected and loaded in the matching logic 44 at 702, and steps 703-707 of the pattern matching search with varying alignment of the matching pattern 600 to the received bit sequence r[n] is executed again with the new matching pattern 600.

In one embodiment, the pattern matching logic 44 declares a match in step 704 when vectors $\overline{p_a}$ and $\overline{m}$ match within a certain pre-defined threshold Hamming distance C, i.e. when the Hamming distance D between vectors $\overline{p_a}$ and $\overline{m}$ does not exceed C. Here, the Hamming distance D is the number of unequal bit positions in the bit sequences $\overline{p_a}$ and $\overline{m}$, and C is the maximum number of unequal bit positions allowed for a match between $\overline{p_a}$ and $\overline{m}$. If the Hamming distance D is greater than C, a pattern mismatch is declared, and a new target sequence 600 or target sequence alignment to the received bit sequence is tried. In general C may be selected in the range from 0, which corresponds to the exact match between the vectors $\overline{p_a}$ and $\overline{m}$, to K, which corresponds to know matching elements in the vectors $\overline{p_a}$ and $\overline{m}$, but is preferably smaller than K. In the exemplary embodiment of FIG. 5 wherein the target patterns 600 are 32 bit long as shown in FIG. 6, the value of C may be selected for example in the range between 1 and 8, for example 3 or 4.

After obtaining the delimiter pattern from a 'signaling' burst, for example as described hereinabove with reference to FIG. 7 and saving a copy 66 of it in memory 60, consecutive upstream bursts received by the PON tester 5 may be synchronized as known in the art using the saved copy 66 of the delimiter pattern, for example following the method 200 of FIG. 2.

In one embodiment of the method, the delimiter finding logic 40 may first execute the matching of different K-bit portions of the first received bit sequence r[n] to each of the pre-defined target bit sequences 600 in order to determine which of the pre-defined target bit sequences 600 matches a best-matched K-bit portion of the first received bit sequence r[n] in the greatest number of bits, and then using the identified best-matching target bit sequence to determine the position of the matching bit pattern 555, and therefore of the delimiter 503, in the first frame bit sequence 501.

In one embodiment of the method, the delimiter finding logic 40 may generate a confidence level metric 722 for the found delimiter, which characterizes the level of confidence in the found delimiter pattern. In one embodiment, the confidence metric 722 may be computed based on, or account for, the Hamming distance D between the target pattern 600 and the matching section of the received bit sequence r[n] for which the matching has been declared.

Optionally, in order to increase robustness of the method described hereinabove, subsequent upstream bursts may be processed to verify the found delimiter pattern 66, such as for example, but not exclusively, the second (sequentially) upstream burst generated by the ONU in the activation process specified in ITU-T G.984. From ITU-T G.984 standard it is known that the second upstream message in the ONU activation process is a second Serial_Number_ONU message, which has generally the same structure as shown in FIG. 3 and FIG. 5, but typically contains somewhat different values in fields 505-508 than the first Serial_Number_ONU message illustrated in FIG. 5. Hereinafter different methods which make the delimiter detection more robust and may optionally be applied are briefly described. By utilizing these additional methods, the confidence level in the found delimiter may be increased, and the confidence metric 722 updated, if the additional method confirms the correct delimiter.

Figure 2:
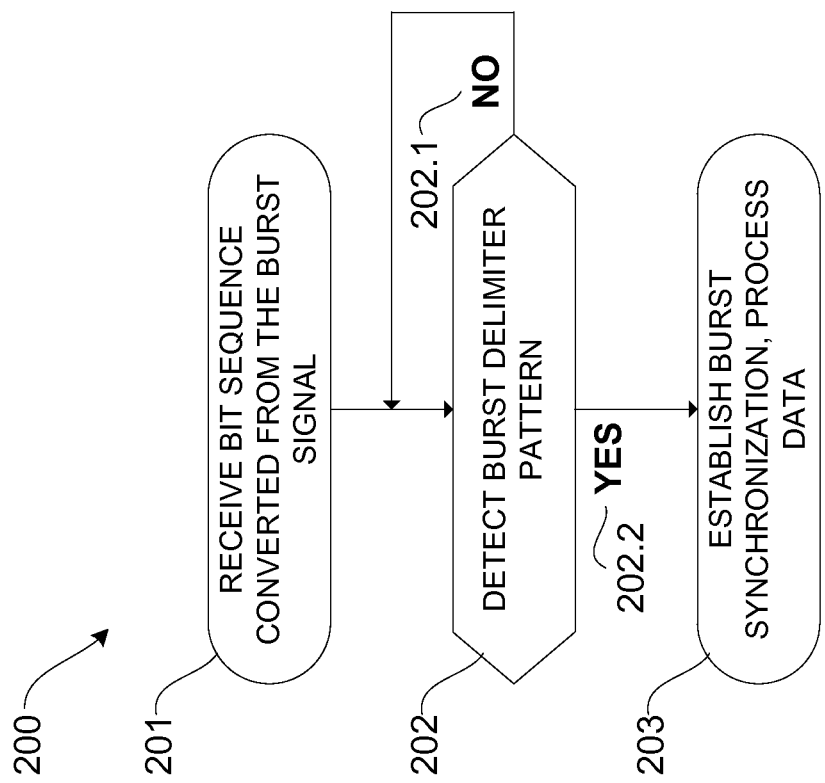
FIG. 2 illustrates a flow chart of a prior art method of upstream bust synchronization by delimiter patter matching.

One additional method that may be implemented by the burst processing logic 31 is to search for the delimiter pattern 503, as obtained from the first Serial_Number_ONU message with the method 700 described above, in a second received bit sequence r2[n] obtained for example from the second Serial_Number_ONU message or a subsequent received burst, for example using method 200 of FIG. 2. If the delimiter pattern 503 is found in the second received bit sequence r2[n], the confidence level metric 722 is increased;

if the delimiter pattern is not found in the second received bit sequence r2[n], the confidence level metric 722 is decreased.

A second additional method is based on utilizing a known structure of the preamble sequence 502, which includes multiple repetitions of a same bit sequence, in the example shown in FIG. 5 corresponding to hexadecimal value A'h. In this method, the burst processing logic 31 may perform a search for a repetitive bit pattern between the first bit in the received bit pattern r[n] 501 and the found delimiter pattern 503, i.e. to verify that the bits immediately prior to the found delimiter 503 in the received bit sequence 501 correspond to a known preamble bit pattern. In one embodiment, if a repetitive bit pattern is recognized, the confidence level metric 722 may be increased; if no repetitive pattern is found, the confidence level metric 722 is decreased.

A third additional method that may be implemented by the delimiter finding logic 40 is to compare the delimiter pattern obtained from the first Serial_Number_ONU message 501 with a set of delimiter patterns 66 stored from previous delimiter pattern discoveries, or with customized patterns that represent commonly used delimiter patterns.

The embodiments described hereinabove are based on the observation that certain 'signaling' bursts or frames, such as the very first (sequentially) burst generated by an ONU in the ONU activation process specified by the ITU-T G.984 that carries the first Serial_Number_ONU message 501, may include a sequence of at least partially known 'fixed' bits at pre-defined fixed bit positions relative to the delimiter, such as the bits in the fields 505-508 of the first Serial_Number_ONU message 501. In other implementations or other transmission systems, those pre-defined fixed bits may be found in a different frame or burst, which would typically have a 'signaling' function and thus include known pre-defined command 'words' or bit sequences, which may be used to synchronize to these specific frames or burst, but which may be generally absent in other bursts or frames in the same communication data stream.

Figure 9:
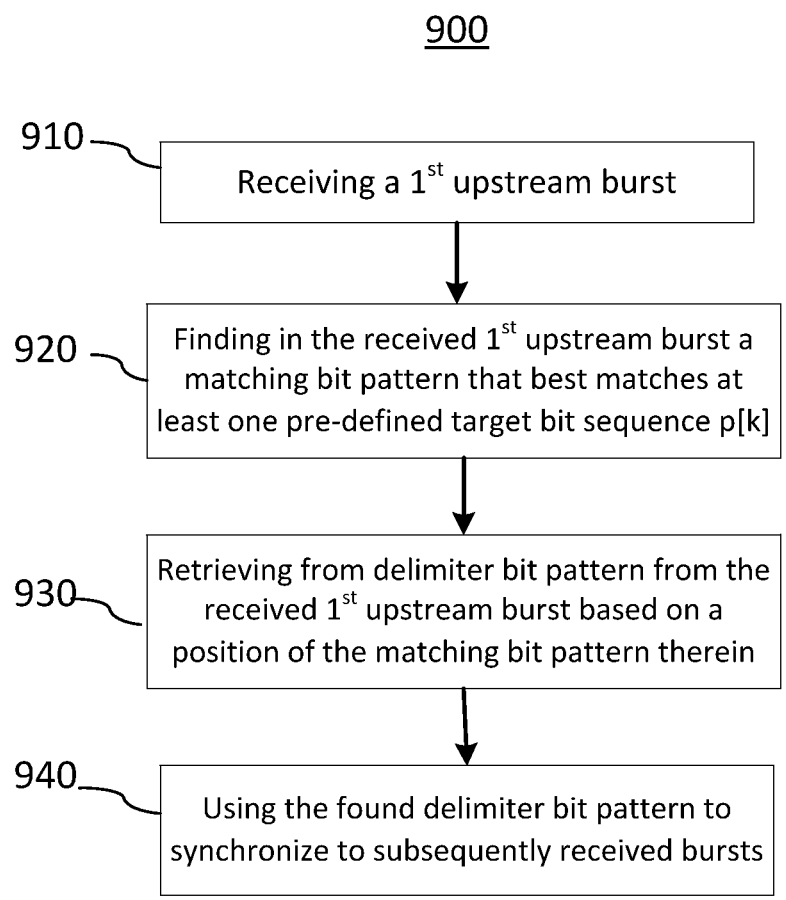
FIG. 9 illustrates a flowchart of a method of synchronizing to upstream transmission bursts in a network testing device without having a-priori knowledge of the delimiter bit sequence.

Turning now to FIG. 9, an embodiment 900 of the method of the present disclosure for synchronization to upstream transmission bursts in a network tester may include the following steps.

At step 910, receiving by the network tester a first upstream burst signal which includes, or corresponds to, a first upstream signaling burst, which is generated by an ONU connected downstream from the network tester and includes an unknown delimiter and a sequence of at least partially fixed bits at known fixed bit positions relative to the delimiter, as exemplified by the delimiter bit sequence 503 and the pre-defined bits in fields 505-508 of the upstream burst 501 illustrated in FIG. 5.

At step 920, the received burst signal is searched for a matching bit pattern that matches at least one pre-defined target bit sequence, as exemplified by the target bit sequences 600 illustrated in FIG. 6. The pre-defined target bit sequence or sequences corresponds to the sequence of at least partially fixed bits in the first signaling burst.

At step 930, the delimiter bit pattern is retrieved from the received first signaling burst based on a position therein of the matching bit pattern found at step 920 and the known position of the at least partially fixed bits relative to the delimiter bit sequence in the first signaling burst, and the found delimiter bit pattern is saved in a delimiter memory of the network tester. The saved delimiter bit pattern is then used to synchronize to subsequently received upstream transmission bursts at step 940.

As stated hereinabove, the first upstream signaling burst in method 900 may be any transmission burst or frame that contains both the yet unknown delimiter 304 or 503 and a sufficiently long, for example at least 10-bit or preferably at least 20-bit long, sequence of at least partially fixed bits at pre-defined fixed bit positions in the burst. In exemplary embodiments described hereinabove with reference to FIGS. 3, 5, and 6, which pertain to a GPON that complies with ITU-T G.984 Recommendations, the first upstream signaling burst may be selected to be the very first (sequentially) burst that is transmitted by a downstream ONU in the ITU-T G.984 defined ONU activation process. In this embodiment, the PON tester may be required to receive the very first burst that the ONU sends after it is connected to the network and is powered on.

Figure 10:
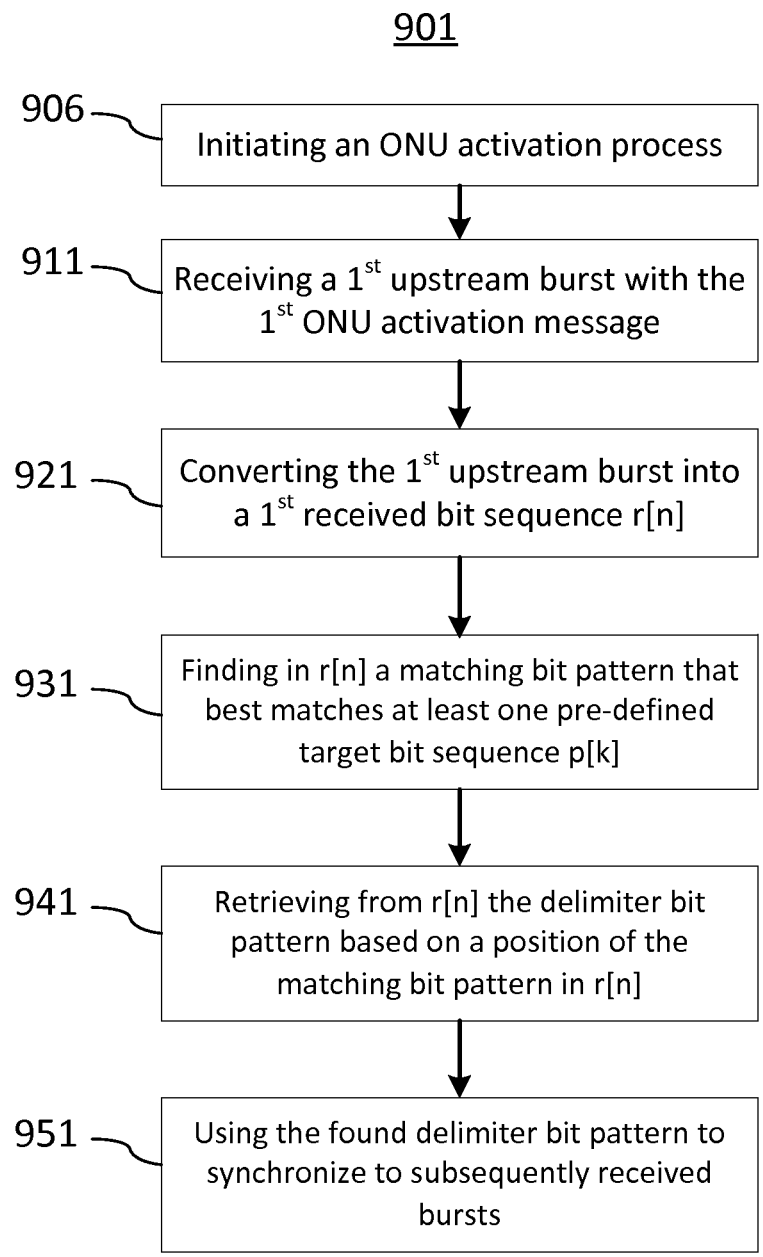
FIG. 10 illustrates a flowchart of one embodiment of the method of FIG. 9 based on detecting a sequence of at least partially fixed bits in a first upstream transmission burst generated by an ONU in an ONU activation process.

Turning now to FIG. 10, an embodiment 901 of the method of the present disclosure for synchronization to upstream transmission bursts in a PON tester may start with step 906, wherein the ONU activation process is initiated, for example the ONU is re-started or powered on for the first time, after the PON tester is connected to the network upstream from the ONU and is set to be ready to receive upstream transmission burst from the ONU. The method than proceeds to step 911, wherein the PON tester receives the first upstream burst that is generated by the ONU in the ONU activation process and contains the first ONU activation message, such as the first Serial_Number_ONU message. At step 921, the first burst signal received by the tester is converted into the first received bit sequence r[n] 501, which at step 931 is searched for a matching bit pattern that matches a pre-determined target bit pattern (600) corresponding to a sequence (555) of the at least partially fixed bits in the first ONU activation message as described hereinabove. At step 941, the delimiter bit pattern 503 is retrieved from the received first bit sequence r[n] 501 based on a position therein of the matching bit pattern found at step 931, and the known position of the at least partially fixed bits 555 relative to the delimiter bit sequence 503 in the first received burst, and the found delimiter bit pattern 503 is saved in a delimiter memory of the tester. The saved delimiter bit pattern is then used to synchronize to subsequently received upstream transmission bursts at step 951.

Advantageously, the method of the present invention, embodiments of which are described hereinabove, enables the PON tester to synchronize to upstream burst, and extract desired data therefrom, automatically without any a-priory knowledge of the delimiter pattern that is conventionally used for burst synchronization, and without the need to receive and decode the downstream messages sent by the OLT. This enables to simplify the PON tester and/or the procedure of testing upstream signals in a PON.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

I claim:

1. A method for synchronization to upstream transmission bursts in a passive optical network (PON) testing device, wherein the upstream transmission bursts comprise a delimiter bit sequence that is unknown to the PON testing device, the method comprising:
    a) receiving, by the PON testing device, a first upstream burst signal comprising a first upstream signaling burst, wherein the first upstream signaling burst includes the unknown delimiter bit sequence and a sequence of at least partially fixed bits at known fixed bit positions relative to the delimiter bit sequence;

b) identifying, in the received burst signal, a matching bit pattern that matches at least one pre-defined target bit sequence, wherein the at least one pre-defined target bit sequence corresponds to the sequence of at least partially fixed bits in the first signaling burst;

c) receiving the delimiter bit sequence from the received first signaling burst based on a position therein of the matching bit pattern found in step (b) and the known position of the at least partially fixed bits relative to the delimiter bit sequence in the first signaling burst, and saving said delimiter bit sequence in a delimiter memory of the PON testing device; and d) using the saved delimiter bit sequence to synchronize to subsequently received upstream transmission bursts.

2. The method of claim 1, further comprising converting the upstream burst signal received by the PON testing device into a first received bit sequence, and saving said first received bit sequence in a buffer memory of the PON testing device, wherein step (b) comprises finding the matching bit pattern in the first received bit sequence, and wherein step (c) comprises retrieving the delimiter bit sequence from the saved first received bit sequence.

3. The method of claim 2 wherein step (b) comprises finding, in the first received bit sequence, the matching bit pattern that differs from the at least one pre-defined target bit sequence in at most C bit positions, wherein C is a pre-defined integer that is less than K, and K>1 is the number of bits in the sequence of at least partially fixed bits.

4. The method of claim 3, wherein the at least one pre-defined target bit sequence comprises a set of pre-defined target bit sequences of length K each, and wherein step (b) comprises b1) matching K-bit portions of the first received bit sequence to one of the pre-defined target bit sequences to find the matching bit pattern; and, b2) if the matching bit pattern is not found in (b1), matching K-bit portions of the first received bit sequence to a next target bit sequence selected from the pre-defined target bit sequences until the matching bit pattern is found, or each of the pre-defined target bit sequences is tried.

5. The method of claim 3, wherein the at least one pre-defined target bit sequence comprises a set of pre-defined target bit sequences of length K each, and wherein step (b) comprises b1) matching K-bit portions of the first received bit sequence to each of the pre-defined target bit sequences;

b2) determining which of the pre-defined target bit sequences matches the first received bit sequence in the greatest number of bits; and, b3) using the best-matching target bit sequence found in step (b2) to determine the position of the matching bit pattern in the first received bit sequence.

6. The method of claim 1, further comprising assigning a confidence level metric to the delimiter bit sequence found in step (c).

7. The method of claim 3, further comprising assigning a confidence level metric to the delimiter bit sequence found in step (c).

8. The method of claim 7, wherein the confidence level is assigned based on the number of bit positions wherein the matching bit pattern found in the received first bit sequence differs from the target bit sequence used in the matching.

9. The method of claim 6, further comprising:

e) receiving by the PON testing device a second upstream burst signal comprising a second upstream burst;

f) searching in the received second upstream burst for a bit pattern that matches the saved delimiter bit sequence; and, g) increasing or decreasing the confidence level metric depending on whether the bit pattern that matches the saved delimiter bit sequence is found in step (f).

10. The method of claim 6, further comprising searching for a repetitive bit pattern in a portion of the received first upstream signaling burst preceding the delimiter bit sequence found in step (c).

11. The method of claim 6, further comprising comparing the delimiter bit sequence found in step (c) to one or more pre-determined delimiter bit sequences.

12. The method of claim 1, wherein the first upstream signaling burst signal comprises a first upstream message transmitted by a downstream optical network unit (ONU) in an ONU activation process.

13. The method of claim 12, wherein the first upstream message comprised in the first upstream signaling burst is a first Serial_Number_ONU message generated by the downstream ONU in the ONU activation process.

14. The method of claim 12, further comprising initiating an activation process of the downstream ONU prior to step (a), and wherein the first upstream burst signal received by the PON testing device is the very first burst generated by the downstream ONU in the activation process.

15. A passive optical network (PON) testing device for receiving upstream transmission bursts from a downstream optical networking unit (ONU), the PON testing device comprising:

an optical to electrical converter to convert a received optical burst signal comprising an upstream data burst into an electrical data signal, wherein the upstream data burst comprises a delimiter bit sequence; and, a clock and data recovery unit to convert the electrical data signal into a received bit sequence representing the upstream data burst;

a burst processing logic to determine the position of a delimiter bit sequence in the received bit sequence;

a data processing unit to process data carried by the received upstream burst; and, an output device to output processing results;

wherein the burst processing logic comprises:

a target bit pattern memory containing one or more pre-defined target bit sequences, the one or more pre-defined target bit sequences representing a sequence of at least partially fixed bits of one of the upstream transmission bursts;

a matching bit pattern finder logic to find in the received burst signal a matching bit pattern that matches one of the one or more pre-defined target bit sequences;

a delimiter pattern extractor logic to extract the delimiter bit sequence from the received bit sequence based on the position therein of the matching bit sequence found by the matching bit pattern finder logic;

a delimiter memory for saving the extracted delimiter bit sequence; and, a burst synchronization logic to synchronize subsequently received upstream transmission bursts using the extracted delimiter bit sequence saved in the delimiter memory.

16. The PON testing device of claim 15, wherein the optical to electrical converter is to convert the upstream burst into a first received bit sequence, and the matching bit pattern finder logic is to find the matching bit pattern in the first received bit sequence.

17. The PON testing device of claim 16, wherein to find the matching bit pattern in the first received bit sequence, the matching bit pattern finder logic is to find, in the first received bit sequence, the matching bit pattern that differs from the one pre-defined target bit sequence in at most C bit positions, wherein C is a pre-defined integer that is less than K, and K>1 is the number of bits in the sequence of at least partially fixed bits.

18. The PON testing device of claim 17, wherein the one pre-defined target bit sequence comprises a set of pre-defined target bit sequences of length K each, and to find the matching bit pattern in the first received bit sequence, the matching bit pattern finder logic is to:
  match K-bit portions of the first received bit sequence to one of the pre-defined target bit sequences to find the matching bit pattern; and,
  if the matching bit pattern is not found, match K-bit portions of the first received bit sequence to a next target bit sequence selected from the pre-defined target bit sequences until the matching bit pattern is found, or each of the pre-defined target bit sequences is tried.

19. The PON testing device of claim 17, wherein the one pre-defined target bit sequence comprises a set of pre-defined target bit sequences of length K each, and to find the matching bit pattern in the first received bit sequence, the matching bit pattern finder logic is to:
  match K-bit portions of the first received bit sequence to each of the pre-defined target bit sequences;
  determine which of the pre-defined target bit sequences matches the first received bit sequence in the greatest number of bits; and
  using the best-matching target bit sequence, determine the position of the matching bit pattern in the first received bit sequence.

20. The PON testing device of claim 15, wherein the burst processing logic is to determine a confidence level metric for the extracted delimiter bit sequence.

* * * * *